(12) United States Patent
Schlesinger et al.

(10) Patent No.: US 9,832,190 B2
(45) Date of Patent: Nov. 28, 2017

(54) MANAGING USER DATA FOR SOFTWARE SERVICES

(71) Applicant: Microsoft Technology Licensing, LLC, Redmond, WA (US)

(72) Inventors: Benny Schlesinger, Herzliya (IL); Guy Kashtan, Ramat Hasharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/318,689

(22) Filed: Jun. 29, 2014

(65) Prior Publication Data

US 2015/0381615 A1    Dec. 31, 2015

(51) Int. Cl.
| | |
|---|---|
| H04L 29/06 | (2006.01) |
| G06F 21/32 | (2013.01) |
| G06F 21/62 | (2013.01) |
| H04L 9/08 | (2006.01) |
| H04L 9/32 | (2006.01) |

(52) U.S. Cl.
CPC .......... *H04L 63/0861* (2013.01); *G06F 21/32* (2013.01); *G06F 21/6245* (2013.01); *H04L 9/0866* (2013.01); *H04L 9/3231* (2013.01); *H04L 63/0428* (2013.01)

(58) Field of Classification Search
USPC ........................................ 713/168, 182, 186
See application file for complete search history.

(56) References Cited

U.S. PATENT DOCUMENTS

| | | | |
|---|---|---|---|
| 5,572,597 A | 11/1996 | Chang et al. | |
| 6,041,133 A | 3/2000 | Califano et al. | |
| 6,766,040 B1 | 7/2004 | Catalano | |
| 7,519,558 B2 | 4/2009 | Ballard | |
| 7,844,827 B1 | 11/2010 | Itoi | |
| 2007/0033414 A1* | 2/2007 | Dunko | G06F 21/10 713/186 |
| 2010/0083358 A1 | 4/2010 | Govindarajan et al. | |
| 2012/0089775 A1 | 4/2012 | Ranade | |

(Continued)

FOREIGN PATENT DOCUMENTS

CN        103441844 A    12/2013

OTHER PUBLICATIONS

Kao, et al., "uCloud: a user-centric key management scheme for cloud data protection," IET Information Security (IET Inf. Secur.), Jan. 2013, 144-154, vol. 7, iss. 2.

(Continued)

*Primary Examiner* — Jeffrey Pwu
*Assistant Examiner* — Samuel Ambaye
(74) *Attorney, Agent, or Firm* — Jeffrey L. Ranck; Ranck IP Law

(57) ABSTRACT

User-specific data for use with a software service may be stored in an encrypted form, where the encryption and/or decryption keys used are associated with a user's biometric data (that the user voluntarily provides after appropriate disclosure, to protect the user's interest in privacy). When the user uses the software service on a device, the device may receive the user-specific data in an encrypted form, and then may use the biometric data to retrieve or generate the cryptographic key that is used to decrypt the user-specific data. The user-specific data is then decrypted and used on the device with the software service.

18 Claims, 5 Drawing Sheets

(56) References Cited

U.S. PATENT DOCUMENTS

| | | |
|---|---|---|
| 2012/0210436 A1 | 8/2012 | Rouse |
| 2012/0323944 A1 | 12/2012 | Robbin |
| 2014/0032924 A1 | 1/2014 | Durham |
| 2014/0101434 A1 | 4/2014 | Senthurpandi |
| 2014/0139318 A1 | 5/2014 | Malpani |
| 2014/0281568 A1* | 9/2014 | Ross ............... G06F 21/32 713/186 |

OTHER PUBLICATIONS

Notification of Transmittal of the International Search Report and the Written Opinion of the International Searching Authority, or the Declaration. Sep. 25, 2015, 11 pages.

Notification Concerning Transmittal of International Preliminary Report on Patentability (Chapter 1 of the Patent Cooperation Treaty) Jan. 12, 2017, 9 pages.

* cited by examiner

MANAGING USER DATA FOR SOFTWARE SERVICES

BACKGROUND

As it becomes increasingly common for software to be provided as a cloud service, users frequently expect a consistent experience across their various devices. Users often expect all of their data (e.g., documents, images, etc.) to be available on all of their devices. Users may also have data that represents personalization of the software experience (e.g., a settings file), and users may expect this personalization data to be available across devices.

When sensitive or user-specific data is to be stored and delivered to various devices, one issue that arises is to secure the data, in order to protect the user's interest in privacy. One way to protect the data is by using a password. However, having the user choose a new password to secure the data imposes on the user the inconvenience of remembering the password, and it is likely that the user already has several passwords to remember for his or her various accounts.

SUMMARY

User-specific data for a cloud-based service may be protected by an encryption key that is identifiable from a user's biometric data, where the user may voluntarily choose to provide the biometric data in order to gain the convenience of securing data without having to remember a password. When encrypted user-specific data is to be received from a cloud service and used on a user device, client software running on the user device may collect (with user permission) biometric data such as a fingerprint, palm print, or iris image. A metric may be generated from the biometric data, and this metric may be used to retrieve or generate a decryption key. The decryption key is then used to decrypt the data. The data may then be used on a given device.

In order to associate user-specific data with a particular key, the user's biometric data may be associated with a particular cluster. The clusters may be generated by taking samples of biometric data, generating a metric for each sample, and by then assigning the samples to clusters. The clusters may be chosen, for example, in a way that minimizes the distance between items in the cluster. For example, a set of fingerprints from a large population may be collected pursuant to appropriate permission from the people who give the fingerprint samples. Each fingerprint may be assigned a metric, and then clusters may be created in a way that minimizes or reduces the distance between metrics in a given cluster. Each cluster may be assigned a decryption key. The keys, the clusters associated with the keys, and the algorithm to assign a given fingerprint to a cluster, may then be made available to client software on user devices. When a user voluntarily gives a fingerprint sample to unlock the encrypted user-specific data, the client software generates a metric from the sample and determines the cluster to which the fingerprint is to be assigned. The software then uses the key associated with that cluster to decrypt the user's data. The decrypted data may then be used to personalize the user experience.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

It has become common for software to be provided as a cloud service, and users increasingly expect the software to provide a consistent experience across devices. In particular, users may expect their data (e.g., documents, images, etc.) to be available on any device, and may expect any personalization data (e.g., user-specific settings) to be available across devices. These types of data are sensitive and are to be protected. One way to protect the data is through a password, but when every service to which a user subscribes asks him or her to generate, remember, and manage a new password, this is an inconvenience to the user.

One way to avoid the use of a password is to deliver the data to the device in an encrypted form, where the decryption key can be readily retrieved or calculated from biometric data, which the user voluntarily provides in exchange for the convenience of not having to use a password. For example, the user may give a fingerprint sample, and a metric may be generated based on the sample. There may be a set of fingerprint clusters, where each cluster is associated with a specific decryption key. The user's sample may be assigned to a cluster, and the key associated with that cluster may be used to encrypt and decrypt the user's data. (In order to protect the user's interest in privacy, the fingerprint sample may be collected and used pursuant to appropriate permission obtained from the user, and after appropriate disclosure to the user.)

The subject matter herein provides a way for a user's data to be used with a software service across multiple devices. The data may be secured without the user's having to generate, remember, and manage a password for the data. The user is asked to provide biometric data, such as a fingerprint. (In order to protect the user's interest in privacy, a disclosure may be provided to the user explaining the purpose for which the biometric data is to be used and explaining the service provider's policy with regard to the use of such data. Of course, the user can choose not to provide such data if the user believes that his interest in privacy outweighs the convenience of using biometric data to secure his information.) Assuming the user does choose to provide biometric data, a metric based on the data is calculated, and the metric is used to identify a cryptographic key. When the user's data is delivered from the cloud to the user's device, the identified cryptographic key is then used to decrypt the data. The user can then use the data on that device. The data may be text documents, images, etc., or may be metadata (e.g., settings) that are used to personalize the user experience.

Figure 1:
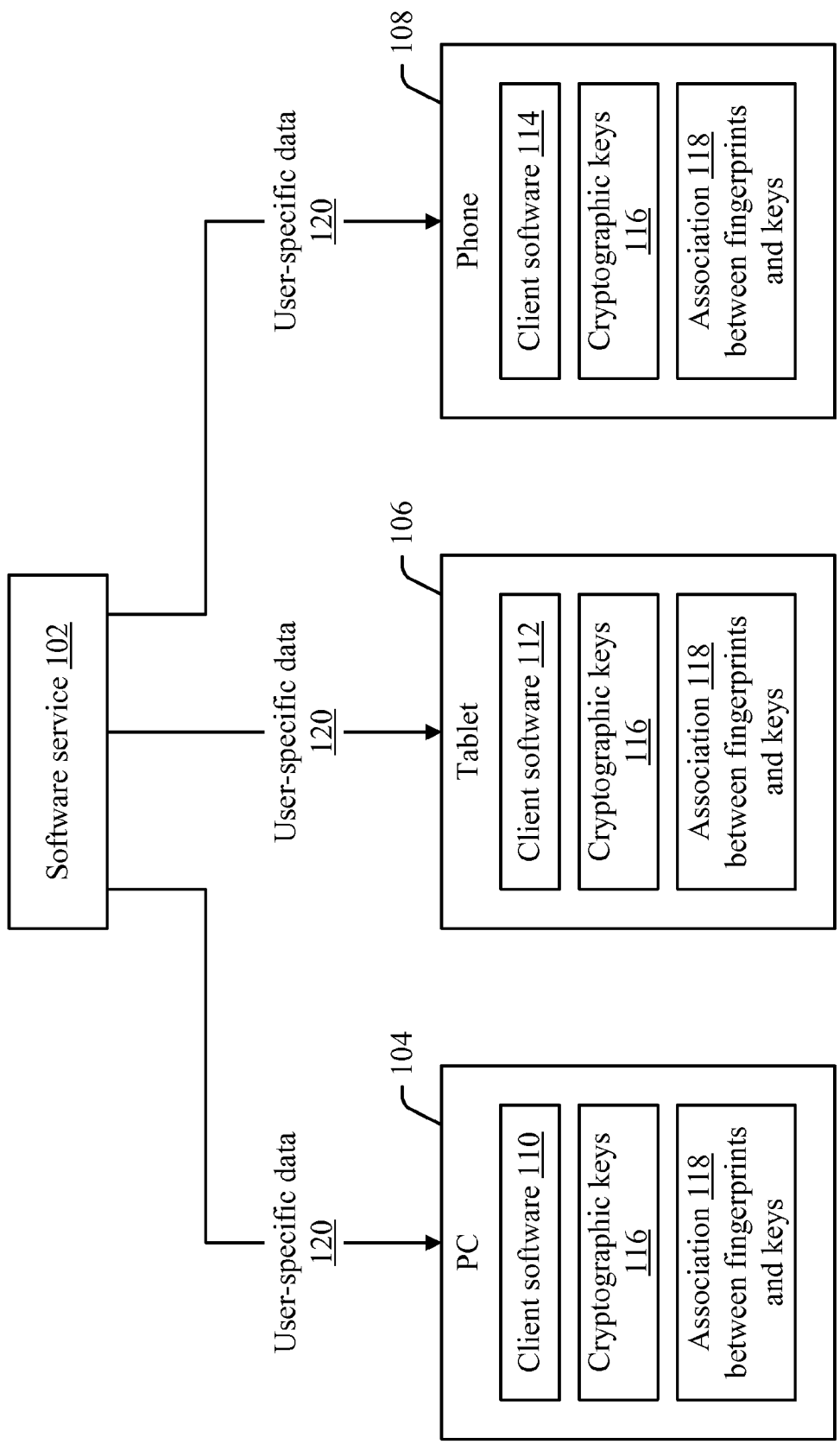
FIG. 1 is a block diagram of an example arrangement in which data may be downloaded to devices.

Turing now to the drawings, FIG. 1 shows an example system in which software may be used as a service, and in which a user's information is tied to biometric data (which the user may choose to provide voluntarily after appropriate disclosure, in order to protect the user's interest in privacy). Software service 102 may be any type of software service, e.g., word processor, spreadsheet, database, social networking site, music streaming service, etc. A user may use software service through various devices 104, 106, and 108. Examples of such devices are shown in FIG. 1: in particular a personal computer (device 104), a tablet (device 106), and a phone (device 108), although these devices are merely examples and any type of device (e.g., the computer/video console on a car, a set top box, etc.) could be used. Each device may be equipped with client software 110, 112, and 114 to facilitate the use of software service 102 on a given device. Client software may simply be a general-purpose browser through which the user accesses the software service. Or, as another example, client software may be a purpose-built application ("app") that is tailored in some manner to the use of software service 102.

Client software 110-114 may maintain, or may otherwise have access to, a set of cryptographic keys 116. Access to cryptographic keys 116 may take the form of a key database stored on a given device, or may take the form of an algorithm that allows a given key to be constructed or reconstructed from some other data (such as from biometric data that the user voluntarily provides after appropriate disclosure). Client software 110-114 may maintain an association 118 between the keys and the biometric data (such as fingerprints). If the keys are stored in the form of a database, then there may be metadata that explicitly associates a given key with a given piece of data. If the keys are generated from biometric data, then the association 118 between keys and data may be implicit in the fact that a key can be generated from the data.

At some point during the use of software service 102, user-specific data 120 may be downloaded to one of the devices 102, 104, or 106. The user-specific data 120 may be user files to be used with the software—e.g., text document (in the case where the software is a word processor); spreadsheets (in the case where the software is a spreadsheet application); drawings, music, video (in the case where the software is a drawing application, a music player or editor, or a video player or editor; and so on. In another example, the user-specific data 120 may be metadata such as user-settings—e.g., data representing a user's chosen background color, font, zoom level, paragraph-indent level (in the case of a word processor), compression format (in the case of a music or video editor), or any other settings that could be specific to the user. Any appropriate type of user-specific data 120 could be used.

User-specific data 120 may be delivered to devices 104-108 in encrypted form. The decryption keys 116, discussed above, may be used to recover the clear version of user-specific data. In order to recover user-specific data 120, client software 110 (or some other software on devices 104-108) may solicit biometric information from a user, such as a fingerprint or iris scan. In order to protect the user's interest in privacy, at the time that the biometric data is solicited the user may be advised (e.g., through a dialog box) about the nature of the information he is being asked to provide and what the data will be used for. Or, if the user is frequently asked to provide biometric data, then the user may be advised of the risks once, with periodic "refreshment" of the reminder.

Figure 2:
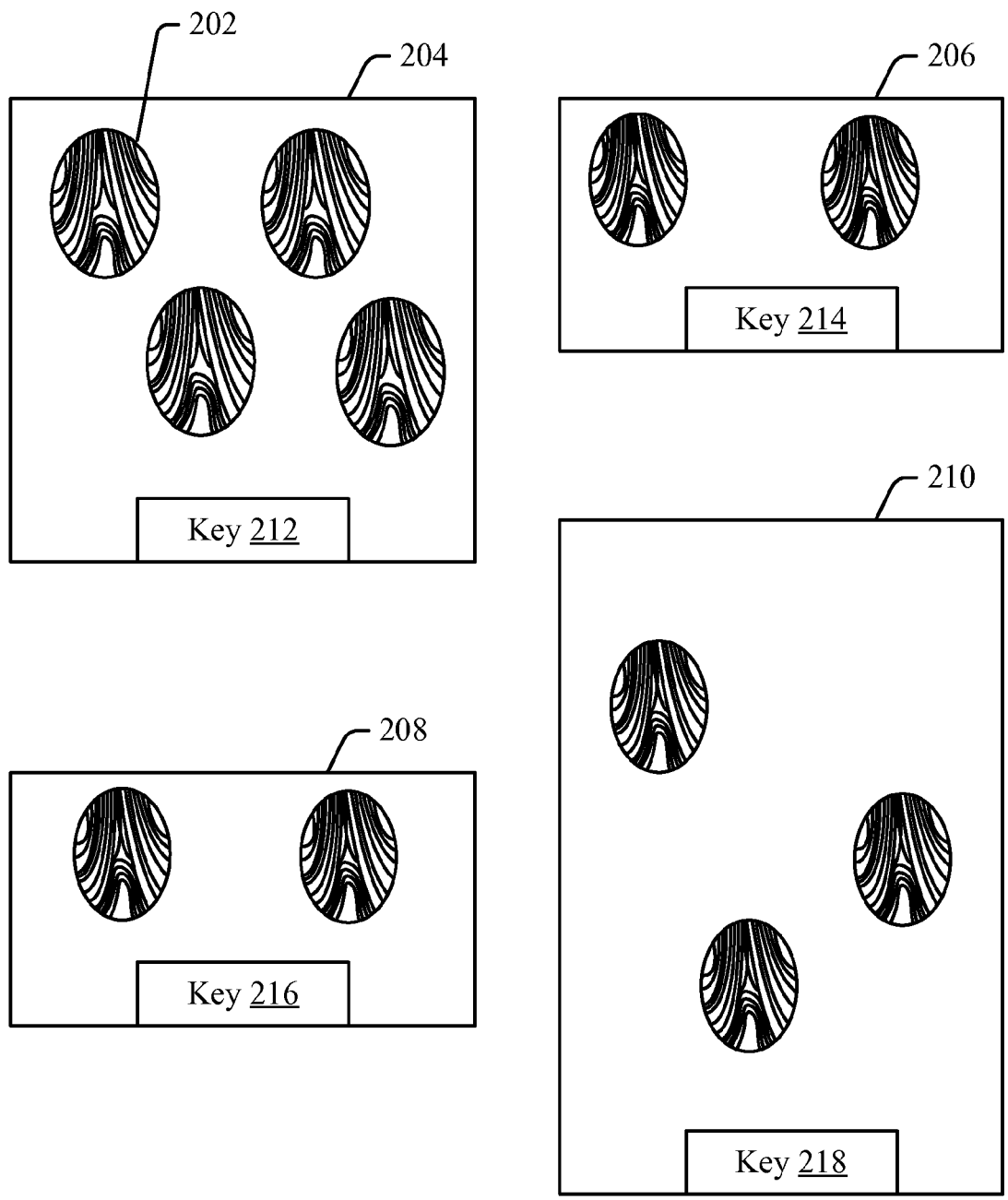
FIG. 2 is a block diagram of an example set of clusters.

FIG. 2 shows an example of biometric data clusters. In the example shown, the biometric data 202 is fingerprints, although other forms of biometric data could be used, such as images of irises. The biometric data shown in FIG. 2 may have been obtained from a public database, in which people have voluntary provided exemplars of their fingerprints after disclosure to protect their interest in privacy. The fingerprints in FIG. 2 are assigned to clusters 204, 206, 208, and 210. In one example, a metric is calculated based on each fingerprint (or other piece of biometric data), and the cluster boundaries are chosen in such a way that minimizes some statistic (e.g., the sum-of-squares distance or variance) within a cluster. Once these boundaries are chosen, the boundaries represent rules on how to assign any given fingerprint (or other piece of biometric data) to a cluster by calculating a metric and then determining the cluster with which the metric affines. In this way, an arbitrary fingerprint can be assigned to one of the clusters.

Each of clusters 204-210 is associated with a cryptographic key. In the example shown, clusters 204, 206, 208, and 210 are associated with keys 212, 214, 216, and 218, respectively. The keys associated with clusters may be used to recover user-specific data in the manner described below in connection with FIG. 6.

Figure 3:
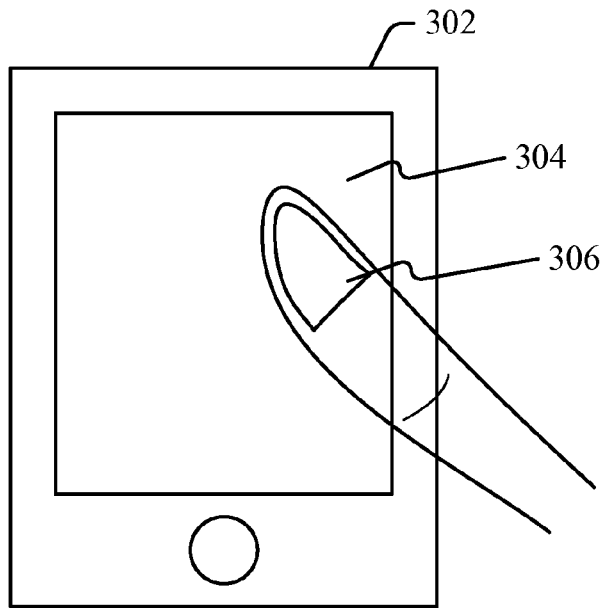
FIGS. 3 and 4 are block diagrams of various ways in which data may be collected from a user.
Figure 4:
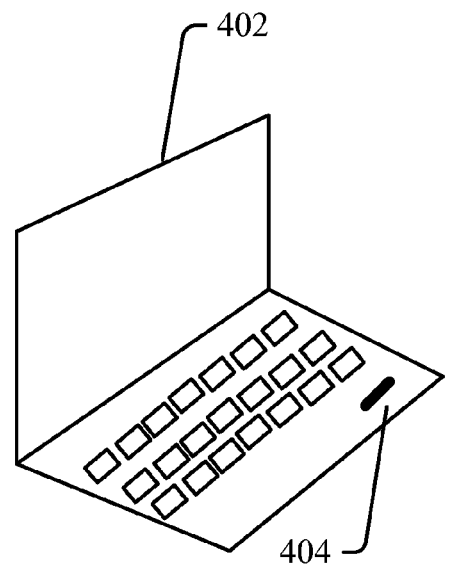

FIGS. 3 and 4 show various example ways in which a fingerprint may be collected from a user. In FIG. 3, device 302 is a smart phone or tablet. Device 302 has a touch screen 304. A user may, upon being requested to do so, press a finger 306 against touch screen 304, thereby allowing touch screen 304 to read the user's fingerprint. In FIG. 4, device 402 is a laptop equipped with a fingerprint reader 404. A user may, upon being requested to do so, scan a finger with fingerprint reader 404 so that device 402 may collect the fingerprint in order to provide the user with the convenience of accessing his user-specific data without the user's having to enter a password. It will be understood that a device could collect biometric data in different ways—e.g., a device may be equipped with a camera that could be used to capture an iris image.

Figure 5:
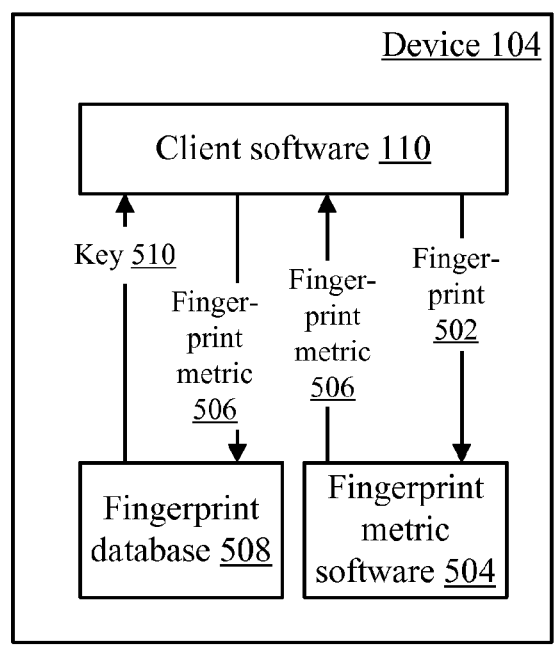
FIG. 5 is a block diagram of an example device that uses data to access a cryptographic key.

FIG. 5 shows an example device that biometric data to access a cryptographic key. Device 104 (which was introduced in FIG. 1), comprises client software 110. As shown above in connection with FIGS. 3 and 4, a device, such as device 104, may collect a fingerprint from a user (which may be done after disclosure and consent, in order to protect the user's interest in privacy). Once the fingerprint 502 has been collected, fingerprint 502 may be provided to fingerprint metric software 504, which may generate a fingerprint metric 506. Fingerprint metric 506 may then be provided back to client software 110. Client software 110 may then use fingerprint metric 506 to look up a key 510 in a fingerprint database 508. Fingerprint database may associate keys with particular clusters of fingerprint metrics. As discussed above in connection with FIG. 2, the boundaries of the various clusters may be well-defined, so that it can be determined, from a given fingerprint metric, which cluster the metric belongs to and, therefore, which key is associated with a given fingerprint.

Figure 6:
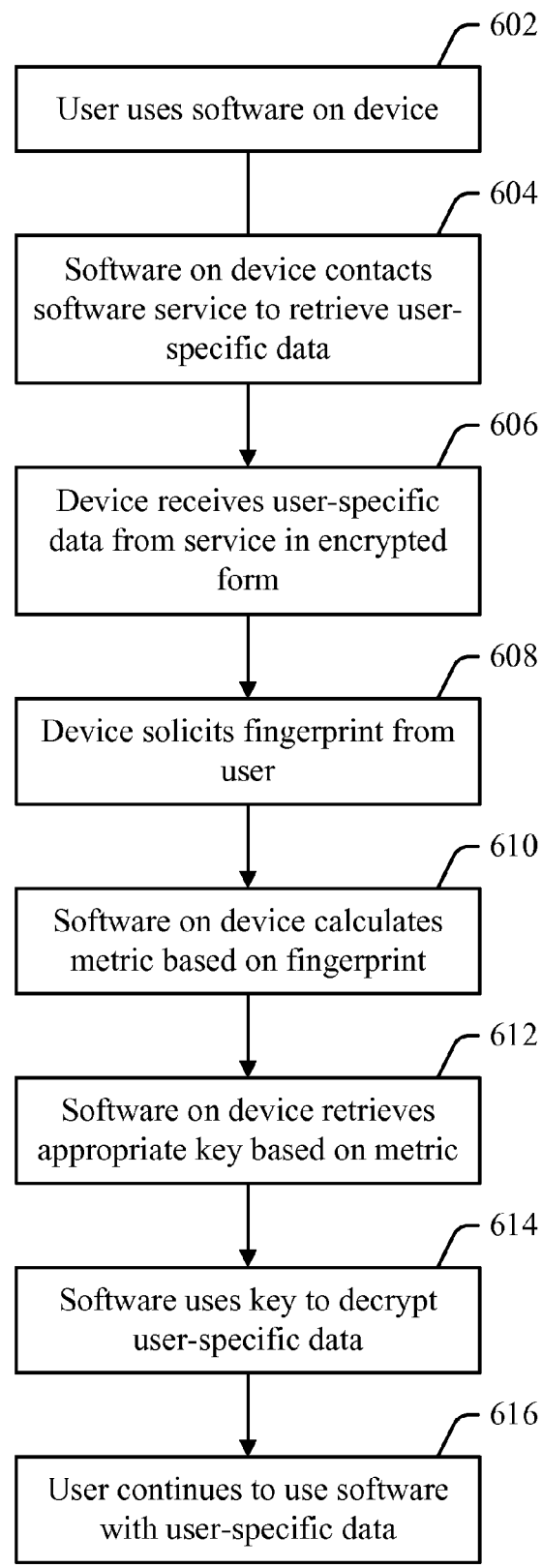
FIG. 6 is a flow diagram of an example process in which software may be used on a device.

FIG. 6 shows an example process in which user-specific data may be used on a device, facilitated by the use of biometric data such as a fingerprint (which the user may voluntarily provided after appropriate disclosure and consent). At 602, a user uses a software service on a device. The device may be a desktop computer, a laptop computer, a tablet, a smart phone, a set top box, a car computer, a wearable computer, etc. The software service may be provided through the cloud, as discussed above. At 604, client software on the user's device may contact the software service to retrieve user-specific data. Examples of user-specific data include user files (e.g., text documents, images, etc.), and/or metadata representing user-specific settings. At 606, the device may receive (from the software service in the cloud, or from any other appropriate place) the user-specific data in encrypted form.

At 608, the device may collect biometric information, such as a fingerprint, from a user. At 610, software on the device may generate a metric based on the fingerprint. At 612, software on the devices retrieves or generates the appropriate cryptographic key based on the metric. If the metric fails to affine unambiguously with a particular key cluster (e.g., "(e.g., if the distance between the key and several clusters is the same, or nearly the same), then any key that is a potential match for the metric may be considered, and these keys may be applied one-by-one to the encrypted data until the correct key is found. At 614, the software uses the key to decrypt the user-specific data that was provided to the device. At 616, the user continues to use the software service on the device, but with the user-specific data that has now been made available to the device.

Figure 7:
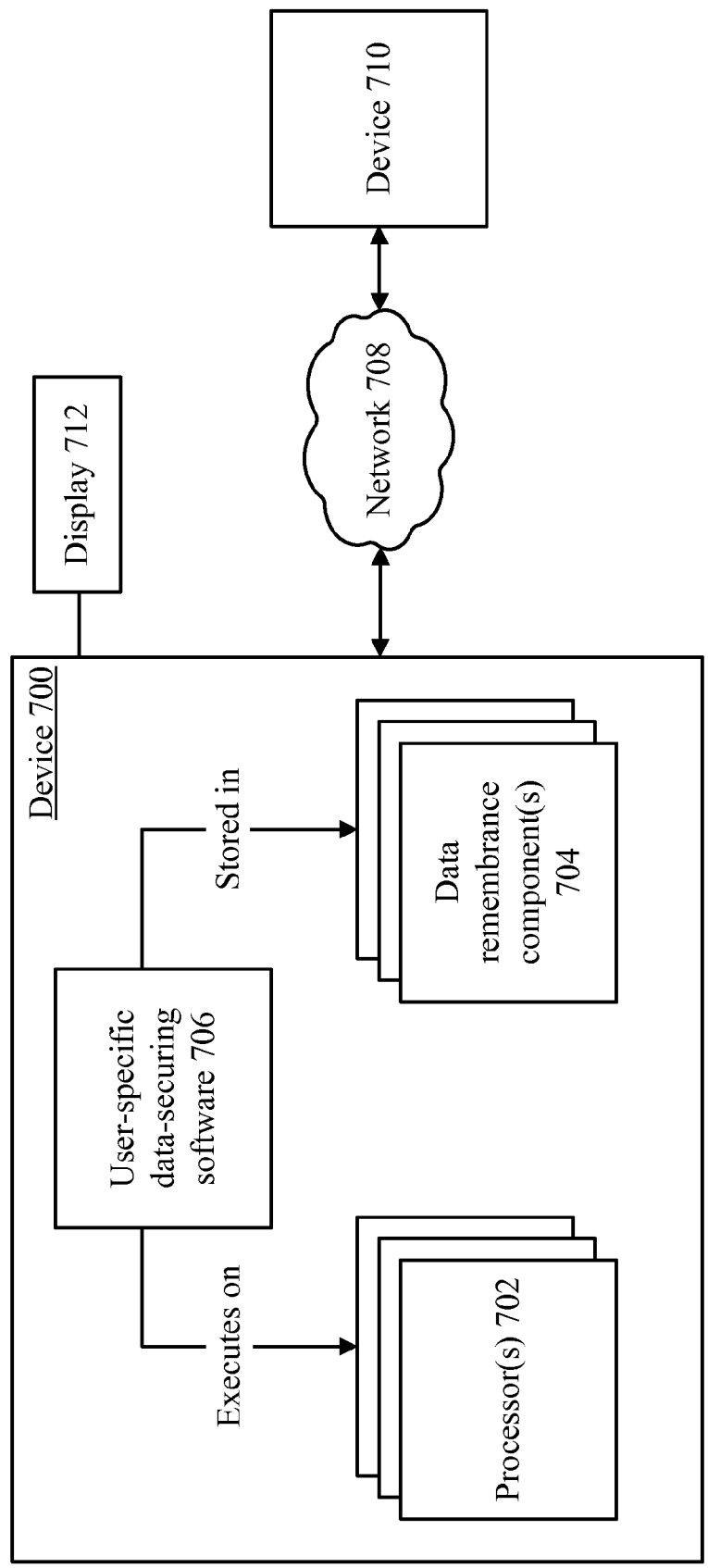
FIG. 7 is a block diagram of example components that may be used in connection with implementations of the subject matter described herein.

FIG. 7 shows an example environment in which aspects of the subject matter described herein may be deployed.

Device 700 (of which computer, smart phones, tablets, set top boxes, car computers, wearable computers, etc., are examples) includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical disks such as CDs or DVDs, and magnetic disks), volatile and non-volatile random-access memory (RAM), read-only memory (ROM), flash memory, magnetic tape, etc. Data remembrance component(s) are examples of computer-readable storage media. Device 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is user-specific data-securing software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as instructions that are stored on one or more computer-readable media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable media, regardless of whether all of the instructions happen to be on the same medium. The term "computer-readable media" does not include signals per se; nor does it include information that exists solely as a propagating signal. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device. "Storage media" are media that store information. The term "storage" is used to denote the durable retention of data. For the purpose of the subject matter herein, information that exists only in the form of propagating signals is not considered to be "durably" retained. Therefore, "storage media" include disks, RAMs, ROMs, etc., but does not include information that exists only in the form of a propagating signal because such information is not "stored." In contrast, communication media may embody computer readable instructions, data structures, program modules, or other data in a modulated data signal, such as a carrier wave, or other transmission mechanism. As defined herein, computer storage media does not include communication media.

Additionally, any acts described herein (whether or not shown in a diagram) may be performed by a processor (e.g., one or more of processors 702) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, device 700 may be communicatively connected to one or more other devices through network 708. Device 710, which may be similar in structure to device 700, is an example of a device that can be connected to device 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-readable medium that stores executable instructions which when executed by a device, causing the device to perform acts comprising:
   receiving encrypted user-specific data from a software service, the user-specific data comprising user files to be used with software, or metadata comprising user settings, or both;
   receiving biometric data from a user of said device;
   calculating a metric from the biometric data;
   comparing the metric to boundaries of a plurality of biometric data clusters, each of the plurality of biometric data clusters representing a plurality of biometric data clustered together by reducing a statistic among the plurality of biometric data;

responsive to the comparison, selecting one of the plurality of biometric data clusters;

retrieving a cryptographic key from a cryptographic key database associated with the selected one of the plurality of biometric data clusters;

using the cryptographic key to decrypt the user-specific data; and using, on the device, the user-specific data, in a decrypted form.

2. The computer-readable medium of claim 1, said biometric data comprising a fingerprint of said user.

3. The computer-readable medium of claim 1, said biometric data comprising an iris image of said user.

4. The computer-readable medium of claim 1, said acts further comprising: contacting said software service to request said user-specific data.

5. The computer-readable medium of claim 1, said device comprising a phone or a tablet.

6. A method performed by a device to of utilizing user-specific data on the device, the method comprising:

receiving, from a software service, encrypted user data comprising at least one of: data a user desires to utilize on the device; or metadata the user desires to use to configure the device;

receiving, via a biometric sensor associated with the device, biometric data associated with the user;

calculating a metric from the biometric data;

comparing the metric to boundaries of a plurality of biometric data clusters, each of the plurality of biometric data clusters representing a plurality of biometric data clustered together by reducing a statistic among the plurality of biometric data:

responsive to the comparison, selecting one of the plurality of biometric data clusters;

retrieving a cryptographic key associated with the selected biometric data cluster;

decrypting the encrypted user data using the cryptographic key; and using the decrypted data on the device.

7. The method of claim 6, said biometric data comprising a fingerprint of said user.

8. The method of claim 6, said biometric data comprising an iris image of said user.

9. The method of claim 6, further comprising requesting the encrypted user data from the software service.

10. The method of claim 6, wherein the cryptographic key is retrieved from a database storing a cryptographic key for each of the plurality of biometric data clusters.

11. The method of claim 6, said device soliciting said biometric data from said user.

12. The method of claim 6, wherein the device comprises a laptop or desktop computer or a mobile phone or a tablet.

13. A system for using a software-service with user-specific data, the system comprising:

a memory;

a processor;

a first component that is stored in said memory, that executes on said processor, that: receives, from the software service, encrypted user data;

solicits, from a user, biometric data;

sends the biometric data to a second component and receives, in return, a metric derived from the biometric data;

compares the metric to boundaries of a plurality of biometric data clusters stored in a biometric database, each of the plurality of biometric data clusters representing a plurality of biometric data clustered together by reducing a statistic among the plurality of biometric data;

responsive to the comparison, selects one of the plurality of biometric data clusters;

decrypts the encrypted user data using a selected cryptographic key;

the biometric database storing a plurality of cryptographic keys for each of the plurality of biometric data clusters; and the second component that:

receives the biometric data from the first component;

calculates the metric from the biometric data;

returns the metric to the first component.

14. The system of claim 13, said biometric data comprising a fingerprint of said user.

15. The system of claim 13, said biometric data comprising an iris image of said user.

16. The system of claim 13, said first component requesting said user-specific data from said software service.

17. The system of claim 13, wherein the metric comprises one of the plurality of cryptographic data clusters.

18. The system of claim 13, said biometric data being collected by a touch screen or a fingerprint reader of said system.

* * * * *